(12) United States Patent
Grover

(10) Patent No.: US 9,927,032 B2
(45) Date of Patent: Mar. 27, 2018

(54) DIRECT DRIVE ASSEMBLY FOR PUMP ASSEMBLY

(71) Applicant: T & E Pumps Ltd., Consort (CA)

(72) Inventor: Corey Grover, Consort (CA)

(73) Assignee: T & E Pumps, Ltd., Consort (CA)

( * ) Notice: Subject to any disclaimer, the term of this patent is extended or adjusted under 35 U.S.C. 154(b) by 599 days.

(21) Appl. No.: 14/541,797

(22) Filed: Nov. 14, 2014

(65) Prior Publication Data
US 2016/0138655 A1    May 19, 2016

(51) Int. Cl.
  *F16J 15/34*  (2006.01)
  *F16J 15/06*  (2006.01)
  *F16L 23/12*  (2006.01)

(52) U.S. Cl.
  CPC ............... *F16J 15/34* (2013.01); *F16J 15/06* (2013.01); *F16L 23/12* (2013.01)

(58) Field of Classification Search
  CPC ...... F04C 11/00; F04C 15/0038; F04C 15/00; F04C 15/0034; F04C 15/0057; F04C 15/0073; F04C 15/0061; F04C 2230/80; F04C 2240/30; F04C 2240/52; F04C 2240/60; F04C 2240/605
  See application file for complete search history.

(56) References Cited

U.S. PATENT DOCUMENTS

| | | | |
|---|---|---|---|
| 3,133,506 A | 5/1964 | Luciani | |
| 5,180,297 A | 1/1993 | Hansen et al. | |
| 6,179,581 B1 | 1/2001 | Schnittger et al. | |
| 8,430,657 B2 | 4/2013 | Simonelli et al. | |
| 2005/0254970 A1 | 11/2005 | Mayer et al. | |
| 2011/0268598 A1 | 11/2011 | Paval et al. | |
| 2012/0244021 A1 | 9/2012 | Umeyama et al. | |
| 2012/0267446 A1* | 10/2012 | Stiegler | F04C 2/14 239/11 |

FOREIGN PATENT DOCUMENTS

| | | | | |
|---|---|---|---|---|
| DE | 10 2004 055 360 | * | 5/2006 | ............. F04C 18/16 |
| DE | 10 2005 016 670 | * | 10/2006 | ............. F04C 13/00 |
| DE | 20 2014 006 000 | * | 10/2014 | ............. F04C 15/00 |

* cited by examiner

*Primary Examiner* — Michael P Ferguson
(74) *Attorney, Agent, or Firm* — Brett J. Slaney; Blake, Cassels & Graydon LLP

(57) ABSTRACT

There is disclosed a motor mount apparatus for coupling a pump body of a fluid pump assembly to a rotational power source (e.g. motor). The apparatus provides a plurality of seals and retaining seal members within a motor mount assembly to cooperate to seal the interior of the apparatus and prevent contaminants such as grit to enter into the interior of the motor mount assembly and subsequently into either the pump body or the power source. The retaining seal member comprises a seal and is fittedly engaged within the motor mount assembly surrounding a shaft coupler. Disposed between the shaft coupler and the shaft is a second seal for cooperating with the seal of the retaining seal member to block external contaminants from entering past the retaining seal member into the housing while containing lubricants on the interior facing side of the retaining seal member.

9 Claims, 11 Drawing Sheets

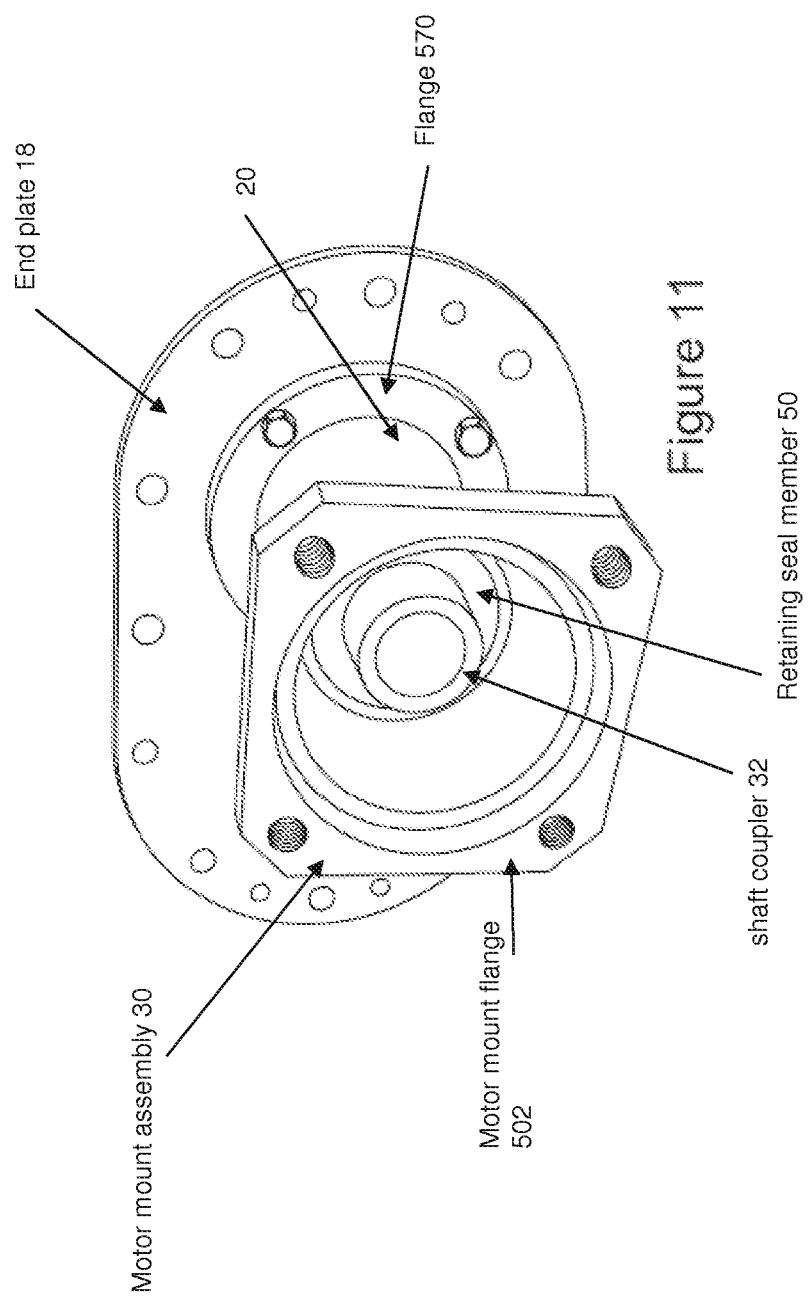

DIRECT DRIVE ASSEMBLY FOR PUMP ASSEMBLY

FIELD OF THE INVENTION

The present disclosure relates generally to pump assemblies and more specifically to a direct drive assembly for use with a pump assembly that is sealed and adapted for coupling the pump assembly to a driving motor or a rotational power source.

BACKGROUND OF THE INVENTION

Fluid pumps are known for use in pumping liquids and fluids, such as oils and distillates produced from oil wells. The oils and distillates can also contain contaminant materials, such as sand, grit and the like. The pumping of such fluids results in the gritty materials that are found in the fluid to come into contact with the pump internal elements such as the pump bearings and the seals, which is disadvantageous as the pump elements exposed routinely to entrained gritty materials have a tendency to wear prematurely and fail after a short period of use.

Furthermore, existing pump assemblies employ couplers for coupling the pump assembly shaft components to the motor for driving the shaft but these coupling components typically leak the lubricant oil or grease (e.g. for supplying grease to the internal components) and other such oils retained within the components to the external environment, causing an increase in servicing and repair of the pump, coupling components and hydraulic motors.

Accordingly there is a need to increase the serviceability of pumps and to increase the operating life of pumps involving pumping fluids containing grit contaminants. More particularly, there is a need for the mechanical components that are used to couple the pump to a motor to limit the contaminants entering into the internal pump components (e.g. from outside the pump housing). Additionally, there is a need for the coupling components to limit the contaminants entering into the motor housing. Therefore, it is an object of the present invention to obviate or mitigate at least some of the above presented disadvantages.

SUMMARY OF THE INVENTION

In one aspect, there is provided a direct drive assembly for coupling a pump assembly to a motor for driving said pump assembly. The direct drive assembly comprises a motor mount assembly for connecting said pump assembly to said motor. The direct drive assembly further comprises a shaft coupler located within the motor mount assembly and adapted for connecting a drive shaft of the pump assembly and a shaft of the motor. The shaft coupler comprises a tubular sleeve having at least one first seal at one end thereof, said at least one seal adapted to engage and sealingly fit between the drive shaft and the sleeve. The direct drive assembly further comprising a retaining seal member, the retaining seal member for slidably engaging and surrounding said shaft coupler and being fixedly retained within the motor mount assembly, the retaining seal member comprising at least one second seal member for surrounding an exterior of said shaft coupler and providing a sealing engagement between the shaft coupler and an interior of the motor mount assembly. In yet another aspect, the at least one first and second seal cooperating with the shaft coupler sleeve to radially surround and seal the interior of the motor mount assembly such as to prevent grit or contaminants from passing to either the motor or the pump.

In one aspect, there is provided a kit of components for coupling a pump assembly to a motor for driving the pump assembly, the kit comprising: a motor mount assembly having a first connecting means at a first end for being configured to connect to the pump assembly and a second connecting means at a second end for being configured to connect to the motor; a coupling assembly comprising: a shaft coupler configured for connecting a drive shaft of the pump assembly and a shaft of the motor; a first seal configured for coupling to one end of the shaft coupler proximal to the pump assembly, the first seal adapted for being located between an exterior surface of the drive shaft and an interior surface of the shaft coupler; a retaining seal member for being slidably received on the shaft coupler such as to surround the shaft coupler, the retaining seal member for being fittedly retained within an interior of the motor mount assembly, the retaining seal member comprising at least one second seal member for encircling the shaft coupler and configured to provide a sealing engagement between an exterior of the shaft coupler and an interior of the motor mount assembly; the retaining seal member and the first seal when assembled on the shaft coupler for cooperating to seal the drive shaft with respect to the interior of the motor mount assembly and to provide a sealed barrier between the coupling assembly and the motor.

BRIEF DESCRIPTION OF THE DRAWINGS

Embodiments are illustrated by way of example only and not limitation, with reference to the following drawings in which like reference numerals indicate corresponding or similar elements, and in which:

FIG. 3(*b*) illustrates a view of the shaft coupler of FIG. 3(*a*) along the lines B-B;

FIG. 3(*c*) illustrates a view of the shaft coupler of FIG. 3(*s*) along the lines A-A;

FIG. 11 is shown from an open end of the direct drive assembly configured for assembly to a motor.

DETAILED DESCRIPTION OF THE PREFERRED EMBODIMENTS

Accordingly, there is generally provided a direct drive assembly for use with a pump assembly that is sealed and adapted for coupling the pump assembly to a driving motor or rotational power source. The direct drive assembly that couples the pump to the motor is preferably sealed to the pump and sealed to the hydraulic motor as described herein, thereby preventing contaminants from entering into either the pump or the motor body such as to increase their respective durability.

In one aspect, there is provided a direct drive assembly for coupling a pump assembly to a motor for driving said pump assembly. The direct drive assembly comprises a motor mount assembly for connecting said pump assembly to said motor. The direct drive assembly further comprises a shaft coupler located within the motor mount assembly and adapted for connecting a drive shaft of the pump assembly and a shaft of the motor. The shaft coupler comprises a tubular sleeve having at least one first seal at one end thereof, said at least one seal adapted to engage and sealingly fit between the drive shaft and the sleeve. The direct drive assembly further comprising a retaining seal member, the retaining seal member for slidably engaging and surrounding said shaft coupler and being fixedly retained within the motor mount assembly, the retaining seal member comprising at least one second seal member for surrounding an exterior of said shaft coupler and providing a sealing engagement between the shaft coupler and an interior of the motor mount assembly. In yet another aspect, the at least one first and second seal cooperating with the shaft coupler sleeve to radially surround and seal the interior of the motor mount assembly such as to prevent grit or contaminants from passing to either the motor or the pump.

Figure 1:
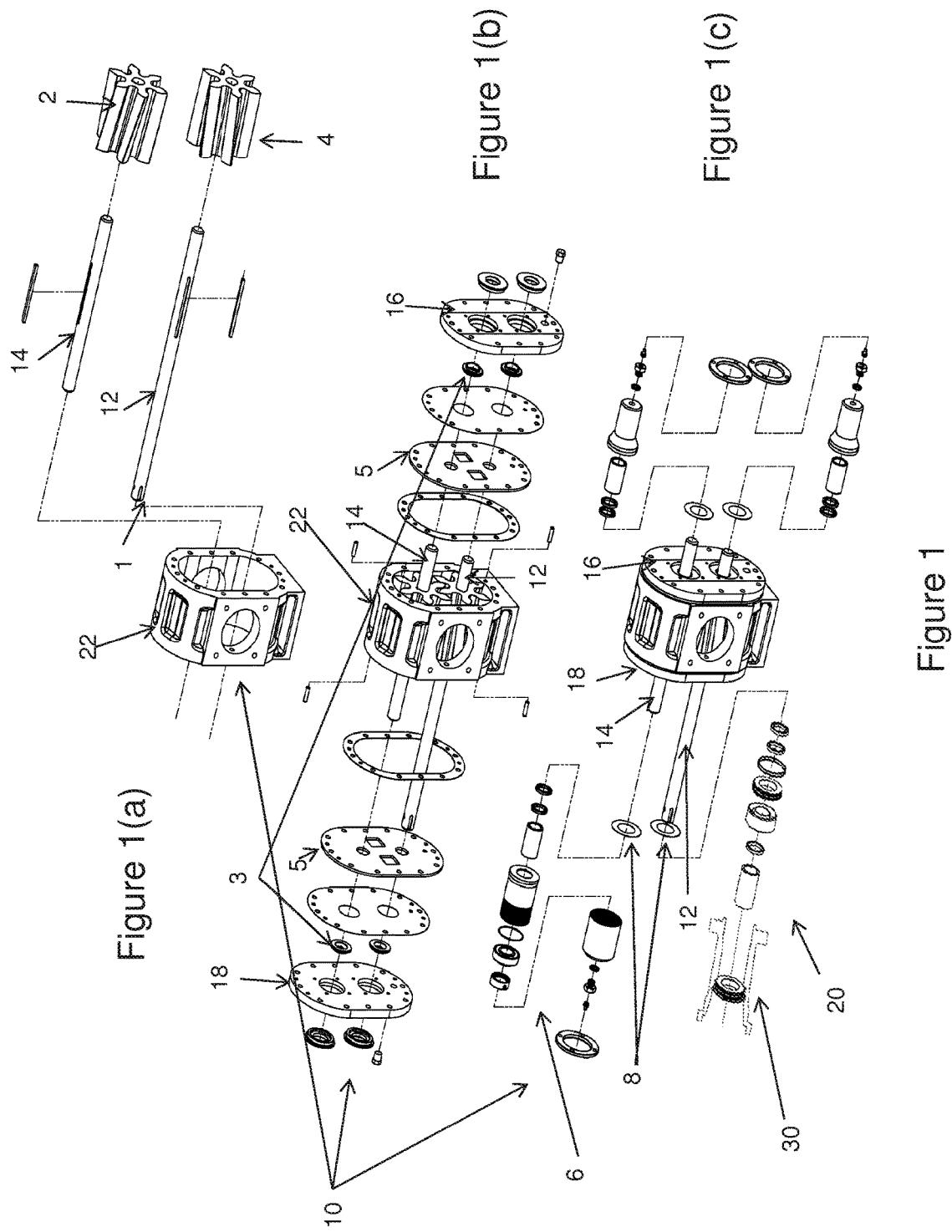
FIGS. 1(*a*), (*b*) and (*c*) are exploded side views illustrating different stages of assembly for a pump assembly and a direct drive assembly (illustrated in FIG. 1 (*c*)), the direct drive assembly for coupling to an external driving power source such as a motor (not shown) in accordance with one embodiment.

FIGS. 1(a), 1(b) and 1(c) illustrate exploded views of a pump assembly 10 and internal components of a pump body 22. FIG. 1(a) illustrates the pump assembly 10, shafts (12, 14) and internal gears (2, 4). FIG. 1(b) illustrates a modular pump assembly 10 having removable endplates (16, 18) and wear plates (e.g. wearplates 5) for attachment to a pump body 22 and comprising shafts (12, 14). FIG. 1(c) illustrates a partial exploded view of the pump assembly 10 having a pump body 22 configured to receive and be coupled to a direct drive assembly 20 at one endplate 18. The direct drive assembly 20 is configured for being received on a drive shaft 12 of the pump that extends longitudinally through a channel defined by the cavity of the direct drive assembly 20 components when assembled together (the cavity further illustrated in FIG. 2). FIGS. 1(a), 1(b) and 1(c) are also collectively referred to as FIG. 1 herein.

Referring to FIGS. 1(a), 1(b) and 1(c), shown is the modular pump assembly 10, configured for pumping fluids such as fluids containing contaminants. The pump 10, includes a pair of end plates 16, and 18 attached to the pump housing or body 22 such that the end plates 16 and 18 are removable in order to access the inside of the pump 22 body cavity and replace the internal pump elements (e.g. pump gears 2, 4 or shafts 12, 14). In one preferred aspect, illustrated in FIG. 1(c), the pump assembly 10, further comprises bearing assemblies 6 that are removably attached to a bearing mount on the outer side of each end plate 16, and 18. In one example, by removing the fasteners that attach a hold down ring surrounding the bearing assembly to the respective endplate 16, 18, access can be provided to the pump bearings and seals without disassembly.

FIGS. 1(a), 1(b) and 1(c) illustrate side views of the pump assembly 10 adapted for coupling to the direct drive assembly 20 configured to further couple the pump assembly 10 to a source of driving rotational power such as a motor (not shown), in accordance with an embodiment. FIG. 1 illustrates exploded views of the pump assembly 10 and a plurality of bearings and seals for being located on the shafts of the pump assembly 10. FIGS. 1(a), (b) and (c) illustrate the configuration and assembly of the pump assembly 10 and its exemplary internal components at different stages of the assembled pump. The pump assembly 10 comprises a drive shaft 12; and an idler shaft 14. Typically, the drive shaft 12 provides rotating support for a first pump gear 4 and the idler shaft 14 provides rotating support for a second pump gear 2. The shafts are generally defined as rotating members for the transmission of power from a power source (e.g. a motor) to the driven components. The pump 10 is further enclosed by a pair of endplates 16, and 18 that are secured (e.g. fastened onto) opposing sides of the pump housing 22. The gears (e.g. 2 and 4) being driven by the shafts 14 and 12, are preferably disposed between the endplates 16 and 18 (FIGS. 1(a) and 1(b)). During operation, fluids to be pumped are captured between the teeth of the gears (not shown) that are mounted on the drive shaft 12 and the idler shaft 14. Preferably, the end plates 16 and 18 are sealingly positioned onto the pump body 22 and then fastened thereon.

Referring again to FIG. 1 (c), the direct drive assembly 20 is adapted to be disposed on and secured onto the end plate 18. Preferably, the direct drive assembly 20 is removably affixed to the end plate 18 by means of fasteners or bolts (not shown) via a motor mount assembly 30, further illustrated in FIG. 2.

Figure 5:
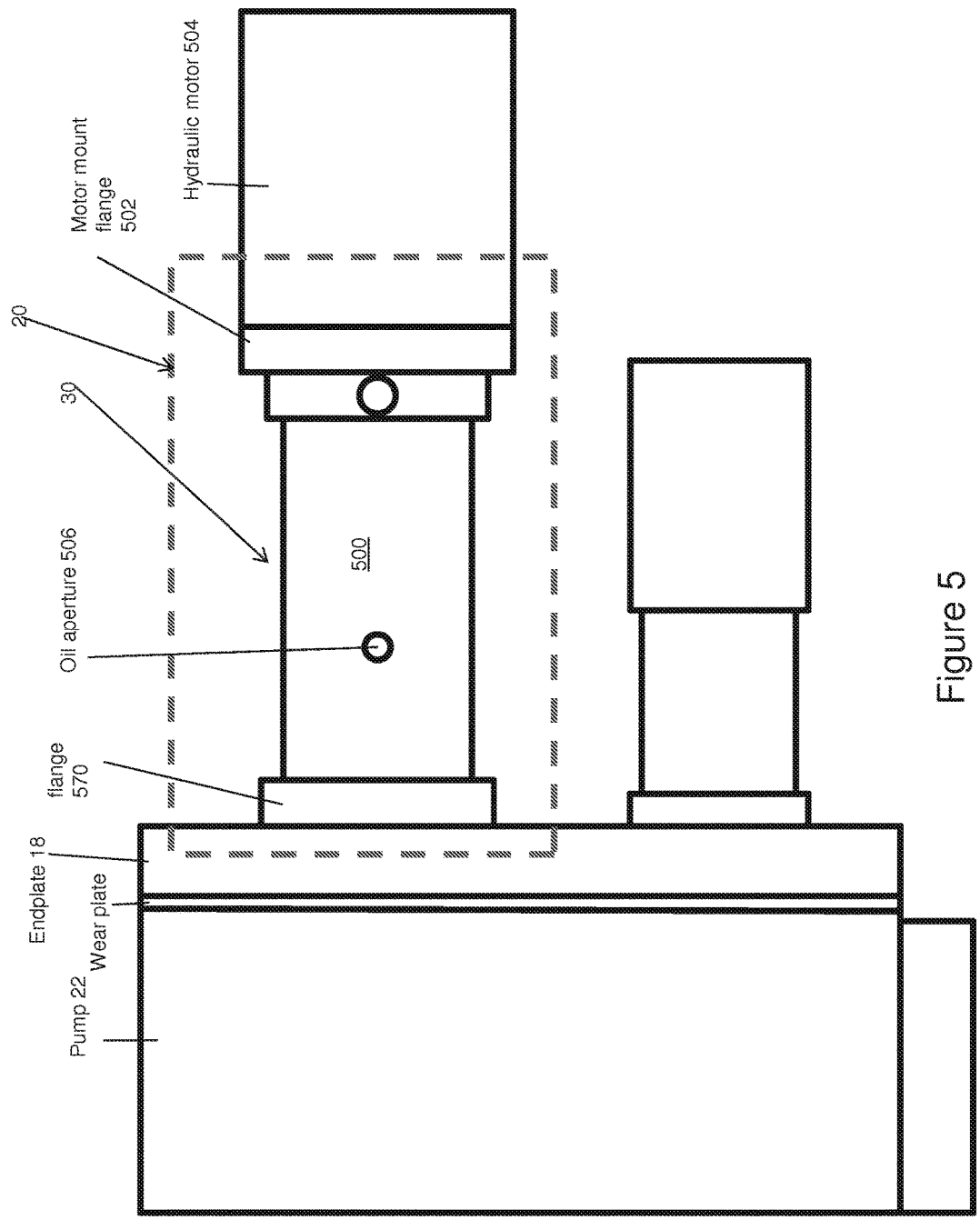
FIG. 5 illustrates a side schematic view of the direct drive assembly coupled to the pump and a hydraulic motor, in accordance with one embodiment.
Figure 6:
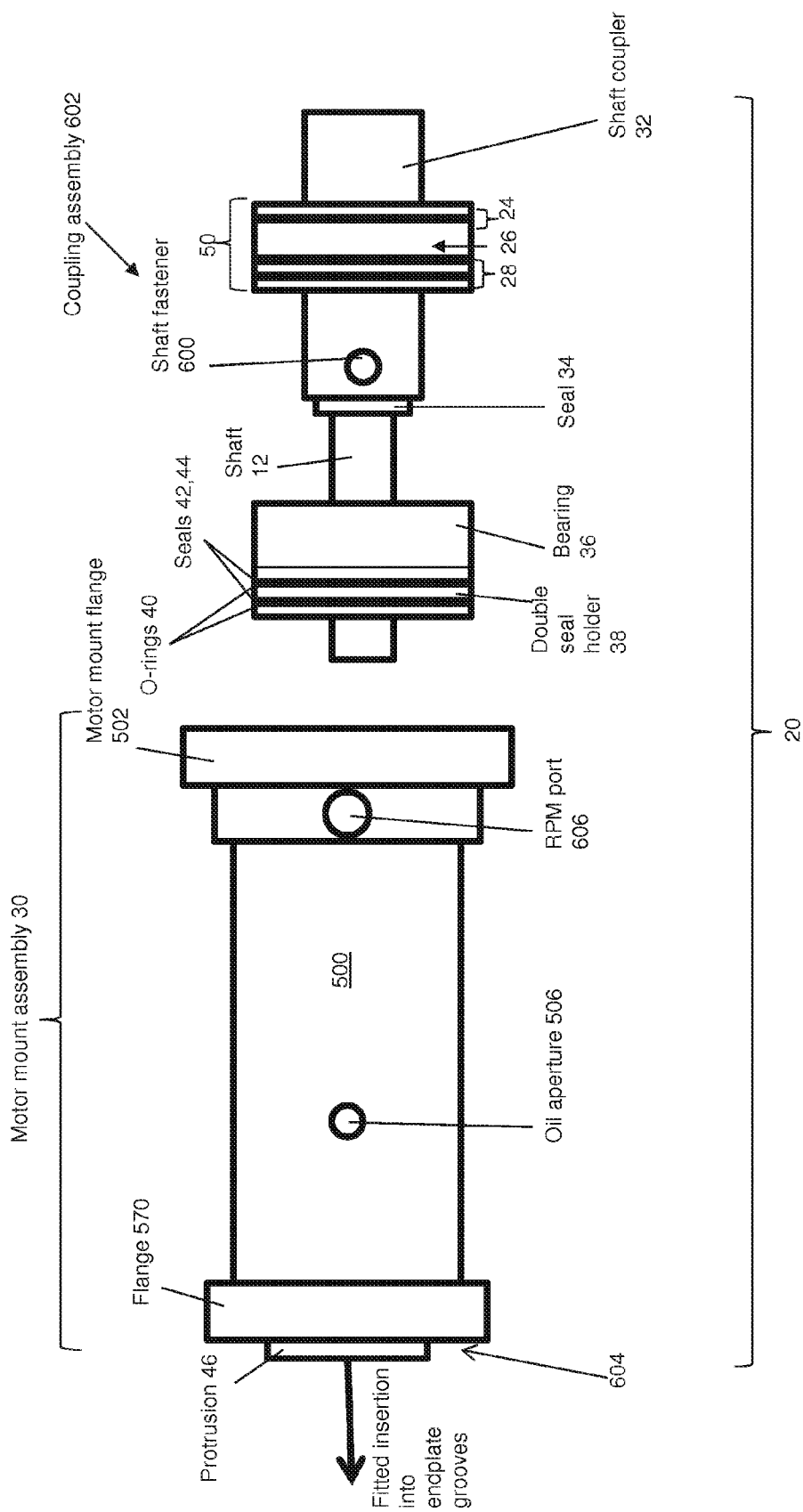
FIG. 6 illustrates a partial exploded side view of the direct drive assembly of FIGS. 1 and 2, in accordance with one embodiment.
Figure 8:
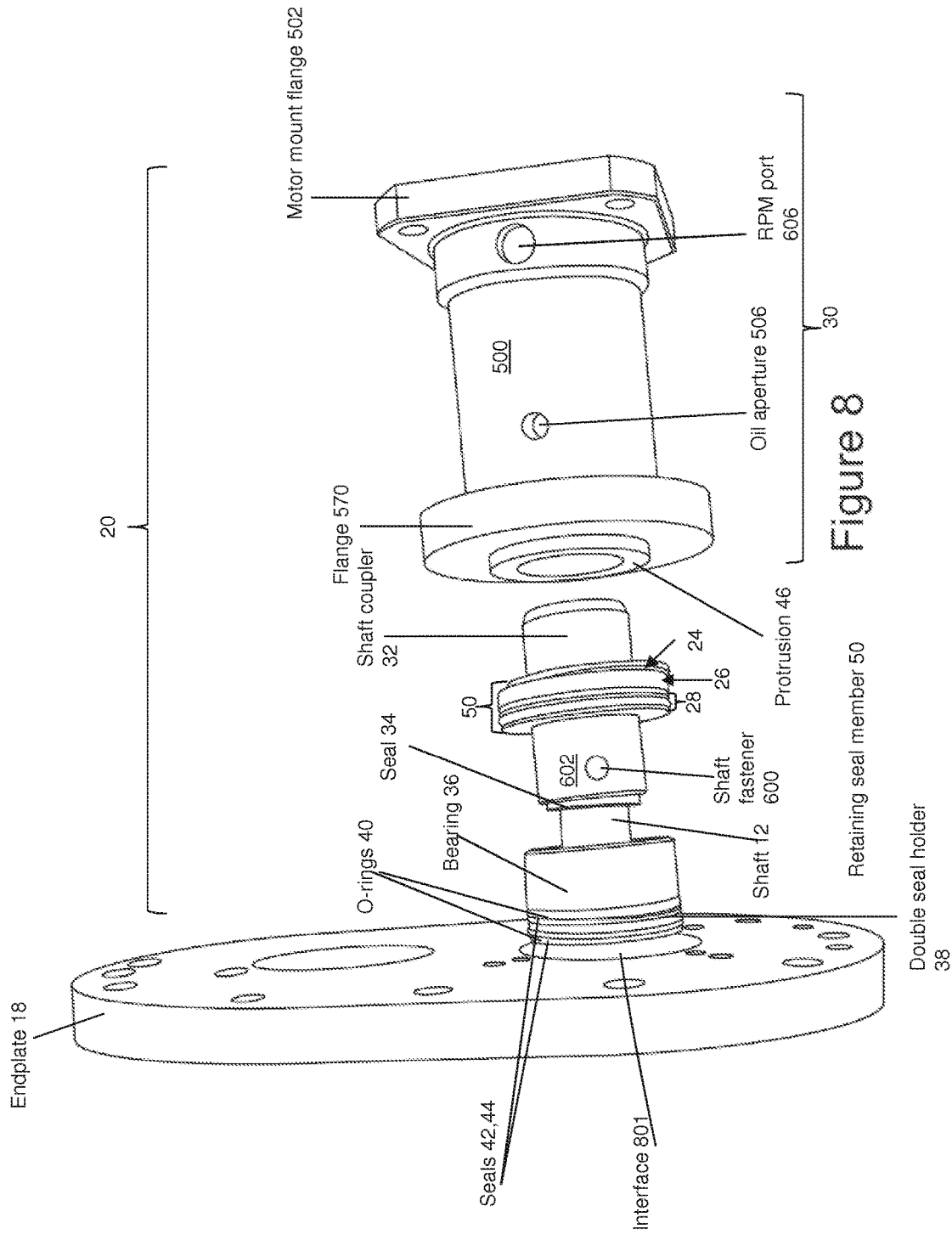
FIG. 8 illustrates a partial exploded side view of the direct drive assembly of FIGS. 1 and 2, during assembly of the direct drive assembly to an endplate of the pump assembly of FIG. 1.

Accordingly, as illustrated in FIGS. 1(c), 6 and 8, the direct drive assembly 20 is configured to seal fluids (e.g. lubricants) from exiting an interior facing side of the retaining seal member 50 (e.g. located proximal to the endplate 18), thereby allowing a channel defined inside the motor mount body 500 (between the retaining seal member 50 and the motor mount flange 502) proximal to the motor or power source (not shown) dry for checking the speed of the motor (e.g. via RPM port 606). In this manner, by keeping the interface between the motor and the retaining seal member 50 dry (e.g. between the motor mount flange 502 and the retaining seal member 50), this improves the life capacity of the power source, such as the hydraulic motor (not shown). The assembly of the direct drive assembly 20 between the pump 22 and a motor 504 is further illustrated in FIGS. 5 and 9, in accordance with one embodiment.

Although numerous exemplary mechanical components of the pump assembly 10 are shown in FIG. 1, as will be understood, modifications can be envisaged to allow additional components or alternative components within the pump assembly 10, while allowing a coupling with the direct drive assembly 20 for receiving motor components (not shown).

Figure 2:
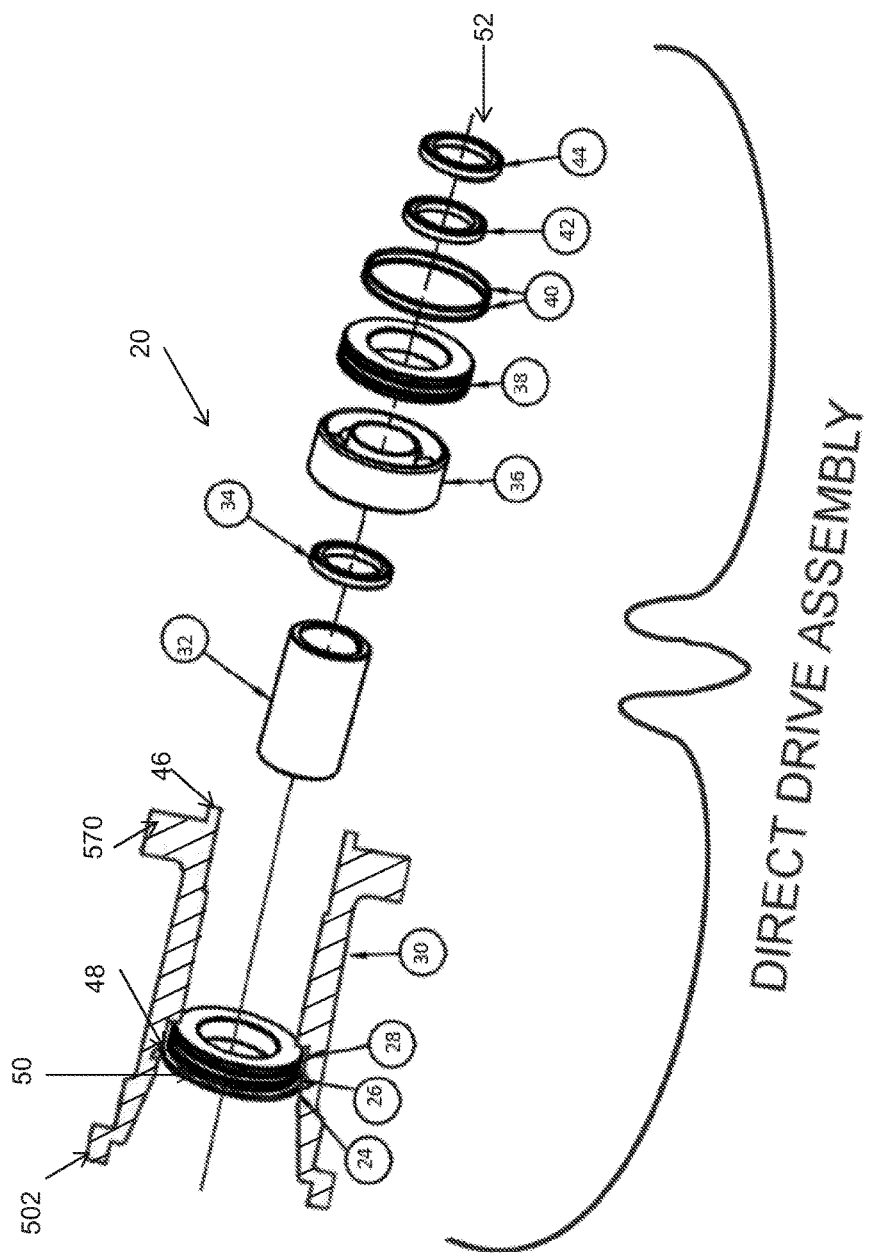
FIG. 2 is a further exploded side view of the direct drive assembly of FIG. 1.

Referring to FIGS. 1 and 2 and as described below, the direct drive assembly 20 defines a cavity 52 for receiving a pump shaft (e.g. drive shaft 12) and corresponding motor shaft (not shown). Preferably, the pump assembly 10, further comprises a grit collar 3 located on an interior side of the respective end plate 16 and 18 and within the pump body 22. The grit collar 3 is configured to be positioned to surround the pump shaft on the interior side of each endplate 16 and 18. The grit collar 3 is located in a mounting recess provided on an internal side (internal to the pump body) of the end plates 16 and 18.

Figure 4:
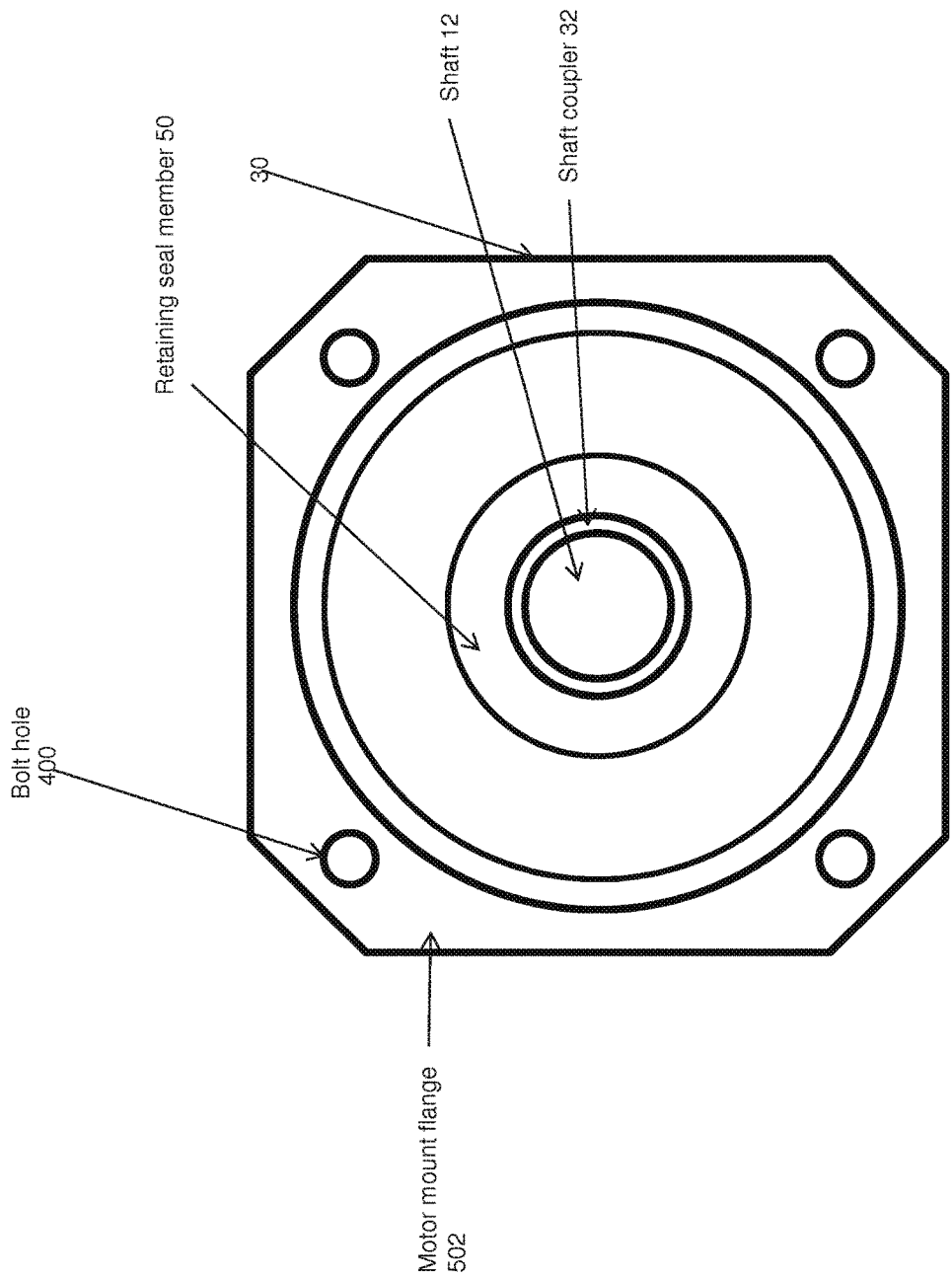
FIG. 4 illustrates an end view of the motor mount assembly of FIGS. 1 and 2 having a plurality of seals and the shaft coupler disposed therein, in accordance with one embodiment.
Figure 7:
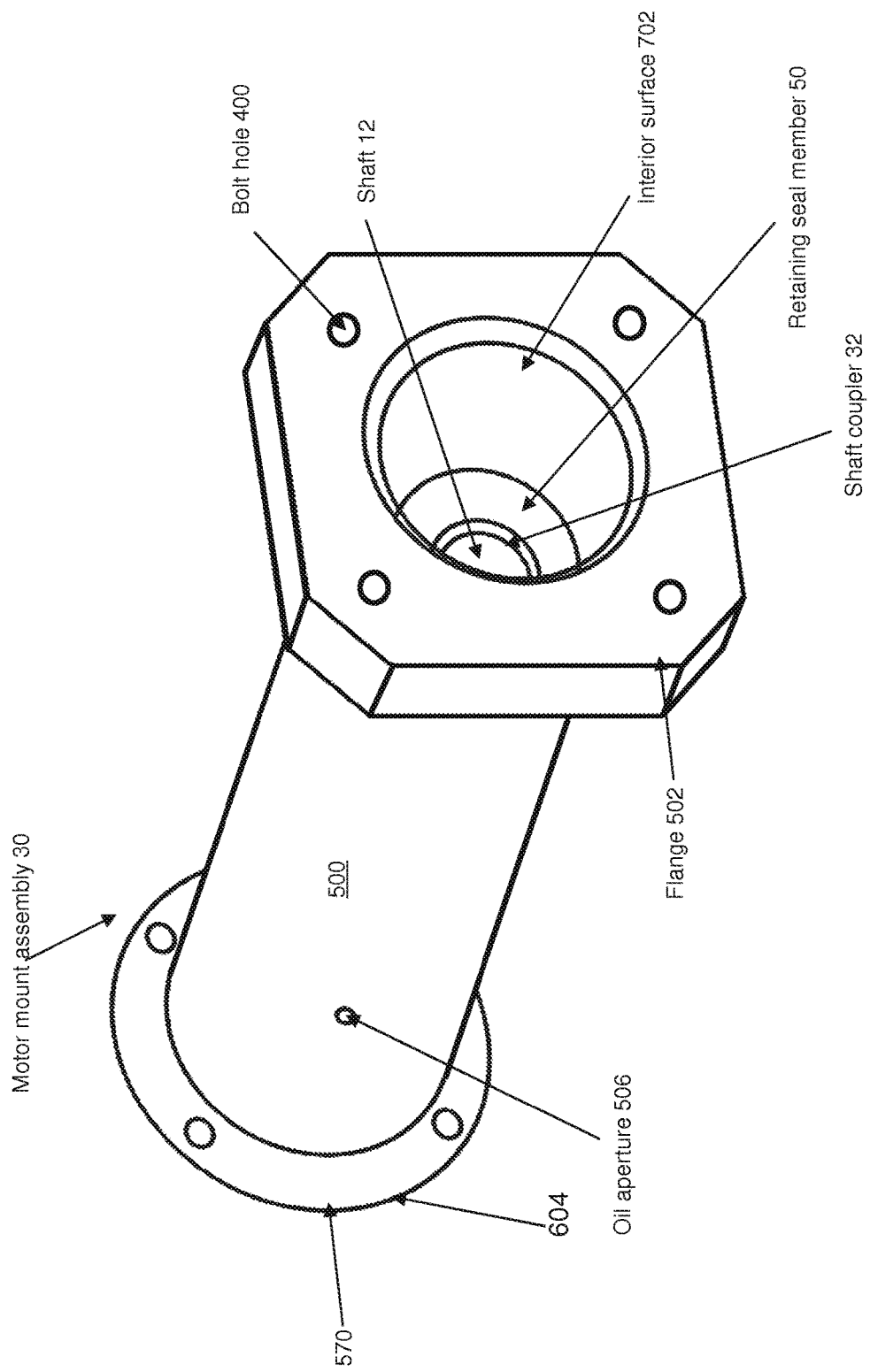
FIG. 7 illustrates a perspective view of the direct drive assembly of FIGS. 1 and 2, in an assembled position, having coupling components and the shaft coupler of FIGS. 1 and 2 contained therein, in accordance with one embodiment.

Referring to FIGS. 4, 5 and 7, shown is the motor mount assembly 30 comprising a plurality of fastener mounts such as bolt holes 400 configured for receiving bolts and for affixing the motor mount assembly 30 onto a side of the pump assembly body 22. Once the motor mount assembly 30 is fastened onto the endplate 18, via the bolt holes 400, the mechanical components located within the motor mount assembly 30 (e.g. pump shaft, motor shaft, and coupling components such as the shaft coupler) are aligned with respect to one another and relative to the pump body 22. In this way, the motor mount assembly 30 and interior components (e.g. pump shaft, motor shaft, and coupling components such as a shaft coupler) are releasably held in place against the endplate 18, when the motor mount assembly 30 is fastened onto the endplate 18. In a preferred embodiment, the motor mount assembly 30, comprises a grease or oil aperture 506 (illustrated in FIGS. 5, 7 and 8) for receiving grease, oil and/or other such lubricants for facilitating the operation of the shafts and increasing the wear of the bearing and mechanical components of the direct drive assembly 20 contained within the motor mount assembly 30 by providing said lubrication for the internal components during operation thereof. Referring to FIGS. 1-2, the motor mount assembly 30 is configured to provide rotational support of the shaft (e.g. drive shaft 12) which extends therethrough.

The motor mount assembly 30 is preferably constructed from steel. Other metals such as brass, stainless steel or aluminum can be used.

Referring to FIG. 2, the internal mechanical components of the direct drive assembly 20 adapted for coupling a pump to a motor (e.g. pump body 22 to a motor 504 in FIG. 5) is illustrated in greater detail, in an exploded view. The direct drive assembly 20 comprises the motor mount assembly 30 which is configured for being releasably affixed to the endplate 18 (shown in FIG. 5) via fasteners and configured for providing rotational support for the drive shaft and the motor shaft (not shown) extending through the cavity 16 defined by the bearings, seals, and coupler members in the direct drive assembly 20 and retained within the motor mount assembly 30. The motor mount assembly 30 comprises a flange 570 for configured for affixing to the endplate 18 (FIGS. 1 and 5) of the pump assembly 10 and a flange 502 that is secured to the motor (e.g. via bolts). The motor mount assembly 30 further comprises protrusions 46 at a longitudinal end for being received within corresponding grooves located in the endplate 18 such as to fittedly seat within the corresponding groove and aid in positioning the motor mount 30 with respect to the endplate 18. The motor mount assembly 30 further comprises internal grooves 48 located within an interior surface of the motor mount assembly 30 defining a channel therethrough. The grooves 48 can be threaded or otherwise indented for receiving and locating a retaining sealing member 50 in place within the motor mount assembly 30 interior surface such as to limit movement thereof along the shafts extending therethrough.

The retaining sealing member 50 comprises a snap ring 24, a spacer 26 and a seal 28. Accordingly, the seal 28 is positioned in abutment against the interior surface of the motor mount assembly 30 for sealingly engaging the interior surface thereof. The retaining sealing member 50 further allows the coupling members and the remaining components of the direct drive assembly 30 retained within the motor mount 30 to maintain longitudinal alignment when disposed on and surrounding the drive shaft 12. The seal 28 is configured to seal the exterior of the shaft coupler 32 (e.g. comprising a tubular sleeve body shown in FIG. 2) with respect to the interior of the motor mount assembly 30. The spacer 26 provides extra strength to support the seal 28 and the snap ring 24 is configured to sit inside the grooves 48 for retaining the retaining seal member 50 and prevent axial movement thereof (e.g. prevent moving out of place towards the dry cavity between the retaining seal member 50 and the motor, not shown).

Referring to FIGS. 6 and 8, there is shown a partial exploded view of the direct drive assembly 20 comprising the motor mount assembly 30 and the coupling assembly 602. Referring to FIGS. 2, 6 and 8, the direct drive assembly 20, further comprises a shaft or a direct drive coupler 32. The shaft coupler 32 is configured to join the pump shaft (e.g. drive shaft 12 of FIG. 1) with the motor shaft (not shown). Further, the shaft coupler 32 is dimensioned to and configured for sliding onto the drive shaft 12 and is affixed thereon such as to limit lateral movement of the drive shaft. The shaft coupler 32 is further received within the motor mount assembly 30 and further received and retained within the retaining seal member 50. The shaft coupler 32 further comprises at least one aperture for receiving a shaft fastener 600 (shown in FIG. 6) and being affixed to the drive shaft 12, shown in FIG. 1.

Referring to FIG. 2, the direct drive assembly 20 further comprises a second seal 34, for being received within the shaft coupler 32 for circumferentially surrounding an interior surface of the shaft coupler 32 and further for surrounding an exterior of the drive shaft 12 and for sealingly engaging thereof. Thus, the second seal 34 resides within the interior of the shaft coupler 32 and directly resides on the shaft 12 for sealing the surrounding exterior surface thereof with respect to the shaft coupler 32. Accordingly, the second seal 34 provides a seal between an exterior surface of the drive shaft 12 and an interior surface of the shaft coupler 32 proximal to the exterior surface of the drive shaft 12. Referring again to FIG. 2, the direct drive assembly 20 further comprises a ball bearing 36, a double seal holder 38, at least two o-rings 40, a third seal 42, and a fourth seal 44. FIG. 6 illustrates a side view of the direct drive assembly components 20 comprising the coupling assembly 602 and the motor mount assembly 30 when partially assembled. FIG. 6 illustrates the coupling of the bearing 36, the seals 42, 44, the shaft coupler 32, the double seal holder 38 for retaining the shaft 12 therethrough in a side view of interior coupling components for the direct drive assembly 20 of FIG. 2.

Referring to FIGS. 2, 6 and 8, the double seal holder 38 is configured to receive the third seal 42 and fourth seal 44 sealingly positioned on an exterior surface thereon. The double seal holder 38 is located directly adjacent to an opening defined in the endplate 18 for receiving the shaft 12 therethrough. As illustrated in FIG. 6, at least two o-rings 40 are configured to be located adjacent to seals 42, 44 and surrounding said double seal holder 38. In one aspect, the two o-rings 40 are respectively connected to the seals 42, and 44. Referring to FIGS. 6 and 8, there is further provided an RPM port 606 which is an aperture located on the motor mount body 500 for allowing an operator to check the operating speed for the motor (not shown) being coupled to the motor mount body 500 (e.g. in revolutions per minute, also referred to as RPM). Preferably, the double seal holder 38 seats against a gasket 8 (shown in FIG. 1(c)), within an interface 801 defining an aperture on the endplate 18.

Referring to FIG. 6, the direct drive assembly 20 comprises the motor mount assembly 30 and the coupling assembly 602. Preferably, the seals (e.g. first seal 28, second seal 34, third seal 42 and fourth seal 44) located on the coupling assembly 602 of the direct drive assembly 20 are lip seals (also referred to as rotary lip seals) and are constructed from a suitable plastic or elastomer having flexibility. The seals are not spring loaded and thus more resilient during use. Additionally, the components of the direct drive assembly 20 (e.g. motor mount assembly 30 and coupling assembly 20) cooperate to sealingly engage and secure the drive shaft 12 within the motor mount coupling assembly 20 such as to not allow any grit or exterior material (e.g. from interfacing with the motor or other external source of power) to enter into the pump body 22 and the channel within the pump body defined for receiving the drive shaft 12 (e.g. interface 801).

Referring again to FIGS. 2, 6, and 8, as can be envisaged, the circumferential dimensions of the retaining seal member 50 and corresponding components (e.g. seal 28, spacer 26, and snap ring 24) are dimensioned such as to sealingly engage and surround the shaft coupler 32 while sealingly engaging and providing interfering fit with the interior of the motor mount body 500. Furthermore, the shaft coupler 32 and the second seal 34 are dimensioned to surround and seal the shaft 12. Additionally, the retaining seal member 50 which surrounds the pump shaft 12 and provides a seal 28 around an exterior of the shaft coupler 32 cooperates with the lip seal 34 disposed between the shaft coupler 32 interior and the exterior of the shaft 12 aids to retain lubricant oil within the motor mount assembly and prevent grit or contaminants from entering into the motor mount assembly and subsequently the pump body. In this way, the cooperation of the seals on the retaining seal member which interferingly fits within the motor mount body 500 interior (and on the exterior of the shaft coupler) and the seal 34 located on an interior of the shaft coupler adjacent to the shaft 12, assists in containing the lubricant oil (e.g. received at aperture 506) within the channel defined by an interior of the motor mount body 500 and prevents grits or contaminants (e.g. from the motor coupling) from passing from the exterior of the motor mount assembly 30 past the retaining seal member 50 and into the channel of the body 500. Thus, the retaining seal member 50 and the seal 34 block any grit or contaminants prior to entry within the channel defined by connecting members 604 (e.g. flange 570 and protrusion 46) configured to connect with and seat into the endplate 18.

Referring to FIGS. 2, 6 and 8, the seal 34 is received at one end of the shaft coupler 32 and located at interior of the shaft coupler 32 between the shaft coupler 32 interior and the shaft 12.

Figure 3:
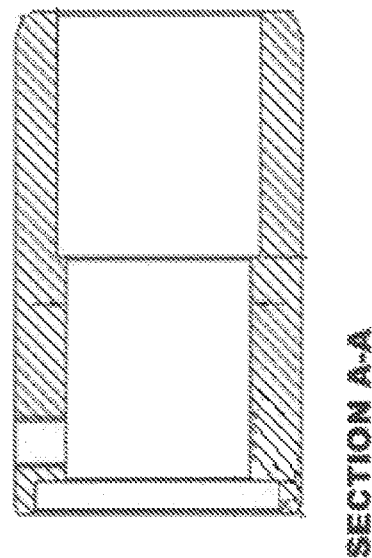
FIG. 3(*a*) illustrates a cross-sectional view of the shaft coupler of FIGS. 1 and 2, in accordance with one embodiment.
Figure 3:
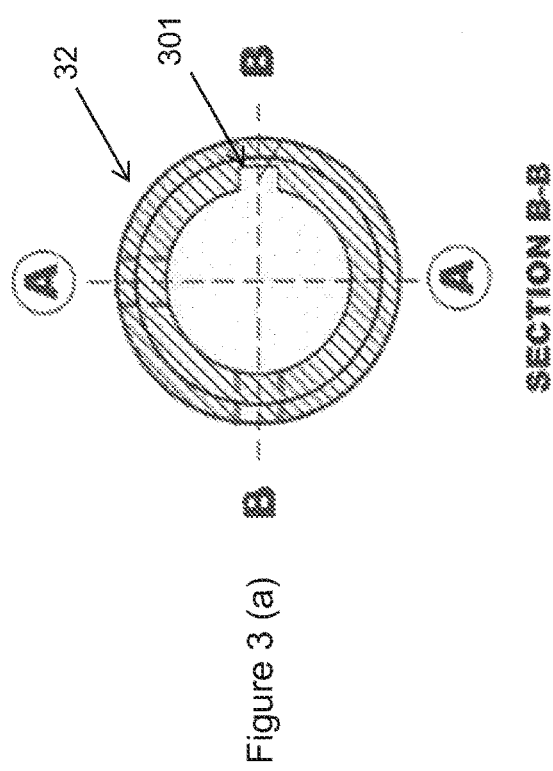
Figure 3:
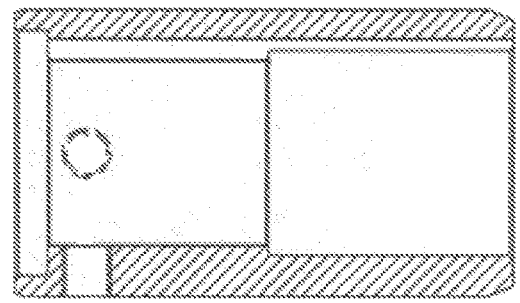

Referring to FIGS. 3(a) to 3(c), there is illustrated exemplary cross-sectional views of the shaft coupler 32 of FIGS. 1 and 2, in accordance with one embodiment. The shaft coupler 32 further comprises a cavity or groove 301 for receiving a key 1 (shown in FIG. 1).

Referring to FIG. 7, shown is a perspective view of the motor mount assembly 30 having the retaining seal member 50 and the shaft coupler 32 disposed therein. FIG. 4 further illustrates an end view of the motor mount assembly 30 of FIGS. 1 and 2, the retaining seal member 50 and the shaft coupler 32 disposed therein, in accordance with one embodiment. FIG. 4 illustrates the motor mount assembly 30 from the end that is configured to be coupled to a motor. It is noted, in accordance with the embodiment illustrated in FIG. 4 that the seal 34 (discussed with reference to FIG. 2) is not visible from this view, as it is recessed into one end of the shaft coupler 32 and configured to surround the shaft 12 at the end of the motor mount assembly 30 for attachment to the motor.

Figure 9:
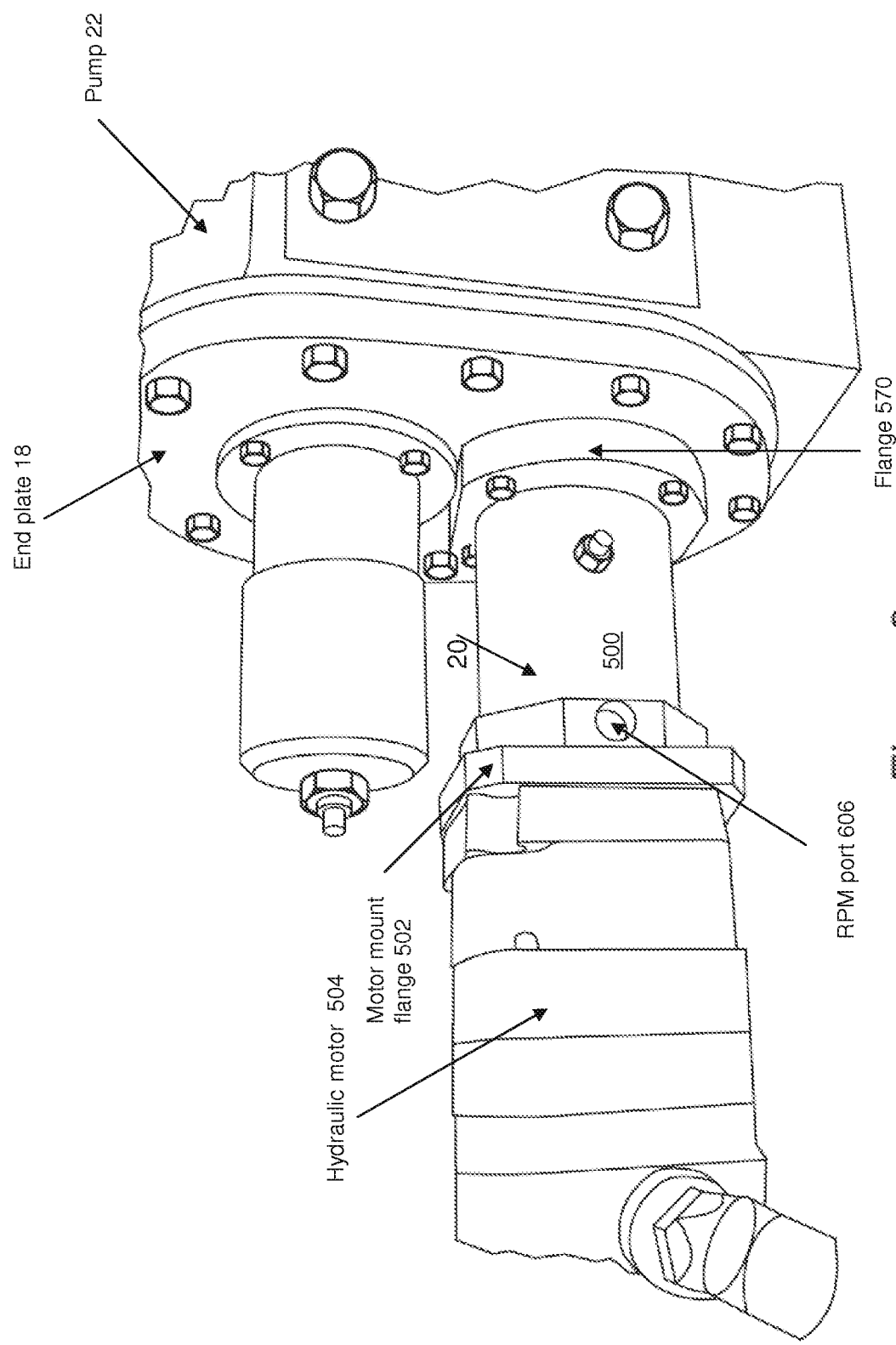
FIG. 9 illustrates a side view of the direct drive assembly of FIG. 2 connected between a pump assembly and a hydraulic motor, in accordance with one embodiment.

FIG. 9 illustrates a side view of the direct drive assembly of FIG. 2 connected to a pump assembly (e.g. pump body 22) and a hydraulic motor 504, in accordance with one embodiment. FIG. 9 illustrates the assembled view of the direct drive assembly 20 comprising the motor mount body 500 and the flange 570 for coupling to the endplate 18 of the pump body 22. FIG. 9 further illustrates the motor mount flange 502 for coupling to the hydraulic motor 504. Additionally, there is illustrated the RPM port 606 for allowing verification of the motor speed.

FIGS. 4, 7 and 11 further illustrate the motor mount assembly 30 and its interior having disposed therein the retaining seal member 50 (disposed between an exterior surface of the shaft coupler 32 and an interior surface 702 of the body 500). FIGS. 2, 6, and 8 illustrate a second lip seal 34 for being disposed on an interior surface of the shaft coupler 32 between the shaft coupler 32 and an exterior surface of the shaft 12 for sealing the shaft 12 exterior relative to the shaft coupler 32. Therefore, the second seal 34 seals between the exterior of the shaft 12 and the interior of the shaft coupler 32. The seal 28 (illustrated in FIGS. 2, 6, and 8) and located on the retaining seal member 50 is configured to seal between the exterior of the shaft coupler 32 and the interior surface 702 of the motor mount body 500. FIG. 7 further illustrates the oil aperture 506 for receiving the lubricant oil to be maintained within the body 500 on an interior of the retaining seal member 50 near the connection components 604 for connecting to the corresponding endplate 18 (e.g. shown in FIGS. 5 and 8).

Figure 10:
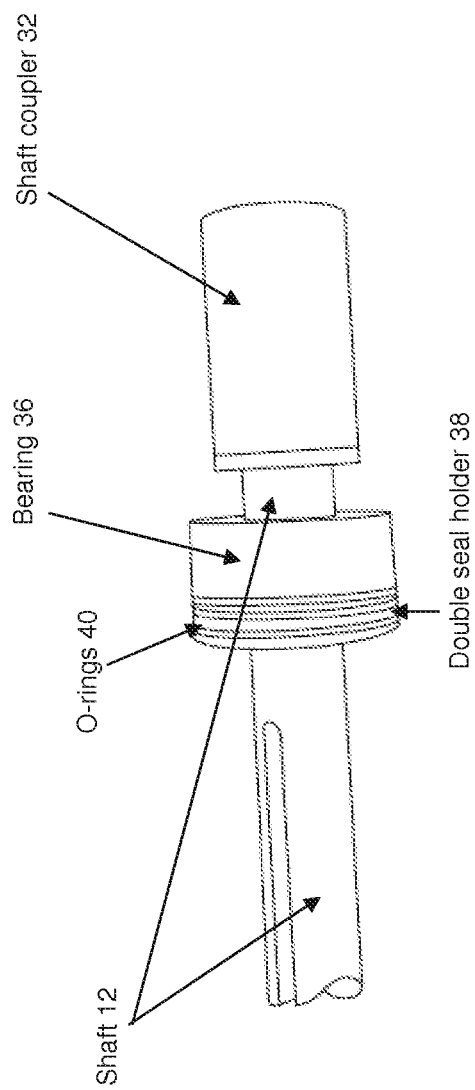
FIG. 10 illustrates a side view of a double seal holder and a shaft coupler of the direct drive assembly of FIG. 2 when installed on a pump shaft; and, FIG. 11 illustrates a perspective view of the direct drive assembly when assembled on a pump endplate of FIG. 8.

FIG. 10 illustrates a side view of the double seal holder 38 and a shaft coupler 32 of the direct drive assembly of FIG. 2 when installed on a pump shaft 12.

FIG. 11 illustrates a perspective view of the direct drive assembly 20 when assembled on the endplate 18 of the pump of FIG. 1 or 8. FIG. 11 is shown from an open and unassembled end of the direct drive assembly 20 configured for assembly to a motor (not shown).

In one example, the direct drive assembly 20 and internal sealing components (e.g. retaining seal member 50, first seal 28, second seal 34, third seal 42, fourth seal 44, double seal holder 38), as shown in FIG. 2, cooperate allow the use of a shaft 12 (e.g. as illustrated in FIGS. 6, 8, and 10) that is shorter, and more compact than known pump shafts (e.g. shorter by up to 10" than existing shafts).

It will be appreciated by a person of ordinary skill in the art that the pump body 22 and the interior components described herein are exemplary and that changes may be made to one or more components (e.g. bearings or gears held within the pump body 22) to accommodate different configurations without affecting the scope of the disclosure herein.

Although various embodiments have been described in the disclosure herein, it will be understood by those skilled in the art that further variations may be made without departing from the scope of the appended claims.

The invention claimed is:

1. A direct drive assembly for coupling a pump assembly to a motor for driving the pump assembly, the direct drive assembly comprising:
a motor mount assembly comprising a first flange comprising fastener mounts at a first end to connect the motor mount assembly to the pump assembly, a second flange comprising fastener mounts at a second end to connect the motor mount assembly to the motor, and a cylindrical body extending between the first and second ends and defining a cavity therein for receiving a pump shaft at the first end and a motor shaft at the second end;
a shaft coupler located within the cavity of the motor mount assembly and adapted for connecting to the pump shaft at one end thereof and for connecting to the motor shaft at the other end thereof, the shaft coupler comprising a tubular sleeve having at least one first annular seal member at the one end thereof to engage and sealingly fit between an exterior surface of the pump shaft and an interior surface of the tubular sleeve; and
a retaining seal member slidably engaging and surrounding the shaft coupler to align the shaft coupler within the cavity for receiving the pump and motor shafts, the retaining seal member being retained between an exterior surface of the tubular sleeve and an interior surface of the body of the motor mount assembly, the retaining seal member comprising at least one second annular seal member providing a sealing engagement between the shaft coupler and the interior of the body of the motor mount assembly;
wherein the at least one first and second seal members cooperate with the shaft coupler sleeve to radially surround and seal the interior of the motor mount assembly with respect to the drive shaft such as to prevent grit or contaminants from passing to either one of the motor and the pump.

2. The direct drive assembly of claim 1, wherein the at least one first seal member and the at least one second seal member cooperate with the retaining seal member and the shaft coupler to provide a first sealed passage within the cavity of the body of the motor mount assembly between the retaining seal member and the second flange, the first sealed passage located at the second end of the motor mount assembly.

3. The direct drive assembly of claim 2, further comprising a bearing assembly located at the first end of the motor mount assembly and permitting passage of the pump shaft therethrough, the bearing assembly comprising a double seal holder located on an exterior surface thereof, the double seal holder retaining at least two seals and at least two o-rings and positioning them between the bearing assembly and the body of the motor mount assembly to provide a seal between the cavity of the body of the motor mount assembly and the pump.

4. The direct drive assembly of claim 3, wherein the at least two seals and the at least two o-rings of the double seal holder provide a second sealed passage located at the first end of the motor mount assembly.

5. The direct drive assembly of claim 4, wherein the double seal holder, the bearing assembly and the retaining seal member cooperate to seal the cavity of the body of the motor mount assembly to retain fluids therein.

6. The direct drive assembly of claim 2, wherein the motor mount assembly further comprises a verification port at the second end for verifying the speed of the motor.

7. The direct drive assembly of claim 1, wherein the retaining seal member further comprises a spacer member for supporting the at least one second seal member and located adjacent thereto and a snap ring configured to fixedly abut the interior surface of the body of the motor mount assembly, the spacer member, the at least one second seal member and the snap ring configured to circumferentially surround and sealingly engage the exterior surface of the shaft coupler.

8. The direct drive assembly of claim 7, wherein the motor mount assembly further comprises a plurality of grooves in the interior surface of the body, the plurality of grooves sized to receive the retaining seal member to prevent axial movement thereof relative to the motor mount assembly.

9. A kit of components for coupling a pump assembly to a motor for driving the pump assembly, the kit comprising:
a motor mount assembly comprising a first flange comprising fastener mounts at a first end to connect the motor mount assembly to the pump assembly, a second flange comprising fastener mounts at a second end to connect the motor mount assembly to the motor, and a cylindrical body extending between the first and second ends and defining a cavity therein for receiving a pump shaft at the first end and a motor shaft at the second end; and
a coupling assembly comprising:
a shaft coupler sized to be located within the cavity of the motor mount assembly and adapted to connect to the pump shaft at one end thereof and to connect to the motor shaft at the other end thereof;
a first annular seal member to engage and sealingly fit between an exterior surface of the pump shaft and an interior surface of the shaft coupler at the one end of the shaft coupler; and
a retaining seal member for slidably engaging and surrounding the shaft coupler to align the shaft coupler within the cavity for receiving the pump and motor shafts, the retaining seal member to be retained between an exterior surface of the shaft coupler and an interior surface of the body of the motor mount assembly, the retaining seal member comprising at least one second annular seal member to provide a sealing engagement between the shaft coupler and the interior of the body of the motor mount assembly;
wherein the retaining seal member and the first seal, when assembled with the shaft coupler, seal the pump shaft with respect to the cavity of the body of the motor mount assembly, and provide a sealed barrier between the coupling assembly and the motor.

* * * * *